Patented Dec. 8, 1942

2,304,624

UNITED STATES PATENT OFFICE 2,304,624

5-SUBSTITUTED TETRAHYDROTRIAZONE

William James Burke, Wilmington, Del., assignor to E. I. du Pont de Nemours & Company, Wilmington, Del., a corporation of Delaware No Drawing. Application April 25, 1940, Serial No. 331,665

1 Claim. (Cl. 260—248)

This invention relates to monomeric heterocyclic compounds containing nitrogen and oxygen or sulfur and more particularly to tetrahydrotriazones. Tetrahydrotriazones having an aliphatic substituent in the 5-position have not hitherto been known.

This invention has as an object the preparation of new compounds, i. e., tetrahydrotriazones having an aliphatic substituent in the 5-position. A further object is the provision of a process therefor, particularly one whereby the new tetrahydrotriazone can be prepared in a single step from inexpensive raw materials. Still further objects include the preparation of new pesticides, lubricant improving agents, drugs, and rubber accelerators.

These objects are accomplished by the following invention wherein a primary aliphatic, including cycloaliphatic, amine is reacted with an aldehyde and an acyclic urea having at least one hydrogen on each of the two amido nitrogens, and the monomeric reaction product is isolated. The reactants may be reacted together in any order, e. g., the monomeric addition product of the urea and aldehyde may be used instead of the separate urea and aldehyde components. The invention also includes the new products, the tetrahydrotriazones having an aliphatic hydrocarbon radical in the 5-position.

The basic substances, s-tetrahydrotriazone and s-tetrahydrothiotriazone have the formulae

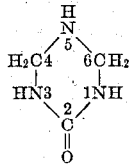

and

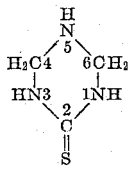

wherein the annular members are given numbers as shown.

In general the primary aliphatic amine is added to a solution of a dimethylolurea in a reaction vessel which is maintained at a temperature of 25–100° C. for a period of from 1 to 24 hours. Most of the solvent is then removed by distillation under reduced pressure, the reaction mixture cooled, and the resulting crystalline product removed by filtration. The product may be further purified by recrystallization from an appropriate solvent. In certain instances it is more convenient to add the amine portion-wise to a cooled solution containing an aldehyde and the urea. Water is usually employed as a solvent, but the use of an inert organic solvent such as dioxan is especially desirable when certain of the reactants are not appreciably water-soluble.

The condensation reaction may be carried out by simply mixing the necessary reagents in a reactor, but it is generally preferable to use a solvent such as water or some inert organic solvent. The amount of solvent may vary between wide limits, but the minimum amount which is necessary to produce a homogeneous reaction system is to be preferred, since this facilitates the isolation of the product and decreases the reaction time.

The urea, aldehyde, and amine, or, alternatively, the dimethylolurea and the amine, may be added to the reactor in any order. It is sometimes desirable to cool the reaction mixture during the addition of the reactants in order to minimize undesirable side reaction. In certain instances it may be preferable to use a preformed dimethylolurea rather than have this compound formed in situ.

The reaction proceeds readily in the temperature range of 15–100° C., but no upper limit is known. However, the tetrahydrotriazones are decomposed by alkaline agents and the amines may bring about decomposition of the products, and undesirable side reactions, including resin formation, may occur if the temperature is much above 100° C. The lower limit is set by the characteristics of the particular reactants and/or solvents. Reaction in aqueous solution obviously requires a temperature between the freezing and boiling points of the solution. Lower temperatures may be employed when solvents of lower freezing point are used. In certain cases in which one or more of the reactants is a gas under operating conditions and it is desirable that no solvent be used, superatmospheric pressure can be employed, but in general the use of atmospheric pressures and a solvent gives very satisfactory results. The choice of solvent depends upon the solubility characteristics of the amine, urea, and aldehyde. If all of the agents are appreciably water-soluble, then water will be a preferred solvent. If certain of the reagents are water-soluble and others are not, then solvents such as dioxan and the dimethyl ether of ethylene glycol are desirable. Hydrocarbons, chlorinated hydrocarbons, ethers and other inert solvents can be used to advantage in those instances in which they are solvents for the particular reagents being employed.

The preferred ratio of reactants is two equivalents of the aldehyde to one equivalent each of the amine and the urea. When a dimethylolurea is reacted with an amine the preferred ratio of reactants is one to one. The presence of any appreciable excess of any one of the reactants is not desirable, since this encourages side reactions including resin formation which cut down the yield and render the isolation of the tetrahydrotriazone more difficult.

The more detailed practice of the invention is illustrated by the following examples, wherein parts given are by weight. There are of course many forms of the invention other than these specific embodiments.

EXAMPLE I

*Tetrahydro-5-methyl-2(1)-s-triazone*

Two hundred and ninety-five parts of a 21% aqueous solution of methylamine is added to two hundred and forty parts of dimethylolurea dissolved in three hundred and forty parts of water. After the solution has been heated at 75° C. for two hours, it is filtered and cooled. About thirty-two parts of a crystalline product is removed by filtration. An additional ninety-one parts is obtained by concentrating the mother liquor. This represents a 55% yield of tetrahydro-5-methyl-2(1)-s-triazone, which melts at 210° C.

| Analysis | Carbon | Hydrogen | Nitrogen | Mol. wt. |
|---|---|---|---|---|
| Found | 41.77 | 8.07 | 36.59 | 110; 117 |
| Calculated for O=C(NHCH$_2$)$_2$NCH$_3$ | 41.74 | 7.83 | 36.52 | 115 |

EXAMPLE II

*Tetrahydro-5-methyl-2-thio-2(1)-s-triazone*

One hundred and forty-eight parts of a 21% aqueous solution of methylamine is added portion-wise with cooling to a solution of seventy-six parts of thio-urea dissolved in one hundred and sixty-two parts of a 37% aqueous solution of formaldehyde. The solution is kept at room temperature for three days and the ninety and five-tenths parts of tetrahydro-5-methyl-2-thio-2(1)-s-triazone which separates out is removed by filtration. Yield: 69%. The product melts at 180° C.

| Analysis | Carbon | Hydrogen | Nitrogen | Sulfur |
|---|---|---|---|---|
| Found | 37.05 | 7.15 | 32.22 | 24.43 |
| Calculated for S=C(NHCH$_2$)$_2$NCH$_3$ | 36.64 | 6.87 | 32.06 | 24.48 |

EXAMPLE III

*Tetrahydro-5-beta-hydroxyethyl-2(1)-s-triazone*

Sixty-one parts of beta-hydroxyethylamine is added to a solution of one hundred and twenty parts of dimethylolurea in one hundred and seventy parts of water. The resulting solution is heated at about 100° C. for two hours and is then kept at room temperature over night. A light yellow solid is obtained by concentrating the reaction mixture under reduced pressure. After two recrystallizations from ethanol, sixty-two parts of tetrahydro-5-beta-hydroxyethyl-2(1)-s-triazone melting at 158° C. is obtained. Yield: 50%.

| Analysis | Carbon | Hydrogen | Nitrogen | Mol. wt. |
|---|---|---|---|---|
| Found | 41.44 | 7.62 | 28.78 | 141; 137 |
| Calculated for O=C(NH—CH$_2$)$_2$NCH$_2$CH$_2$OH | 41.48 | 7.59 | 28.97 | 145 |

Tetrahydro-5-beta-hydroxyethyl-2(1)-s-triazone liberates formaldehyde when warmed in a dilute acid solution. When this tetrahydrotriazone is heated with a dilute sodium hydroxide solution the odor of ethanolamine is pronounced.

EXAMPLE IV

*Tetrahydro-5-cyclohexyl-2-thio-2(1)-s-triazone*

Forty-nine and five-tenths parts of cyclohexylamine in one hundred parts of dioxan is added portion-wise with cooling to thirty-eight parts of thiourea dissolved in eighty-one parts of a 37% aqueous solution of formaldehyde. The solution, after remaining at room temperature for sixteen hours, is then concentrated. By recrystallizing the resulting solid product from ehanol, eighty-five parts of tetrahydro-5-cyclohexyl-2-thio-2(1)-s-triazone melting at 172° C. is obtained. Yield: 85%. Analysis: Calculated for

sulfur 16.05%. Found, sulfur 16.03%.

EXAMPLE V

*Tetrahydro-5-isobutyl-2(1)-s-triazone*

Seventy-three parts of isobutylamine is added portion-wise with cooling to sixty parts of urea dissolved in one hundred and sixty-two parts of a 37% aqueous solution of formaldehyde. After the reaction mixture remains at room temperature for two days about fifty-four parts of crude solid tetrahydro-5-isobutyl-2(1)-s-triazone separates out. Yield: 34%. The product after crystallization from ethyl acetate melts at 200° C. Analysis: Calculated for

nitrogen 26.75%. Found, nitrogen 26.63%. The compound is insoluble in water but is soluble in oxygenated organic solvents such as ethanol and dioxan.

EXAMPLE VI

*Tetrahydro-5-lauryl-2-thio-2(1)-s-triazone*

Seventy-four parts of freshly distilled laurylamine is added to thirty and four-tenths parts of thiourea dissolved in sixty-four and eight-tenths parts of a 37% aqueous solution of formaldehyde. In order to obtain an homogeneous system two hundred and seventy-five parts of dioxan is added to the reaction mixture. The solution is cooled after being kept at room temperature for twenty hours. One hundred and eight parts of tetrahydro-5-lauryl-2-thio-2(1)-s-triazone, which has separated out, is removed by filtration. The product melts at 153° C. after recrystallization from ethanol. Yield 95%. Analysis: Calculated for

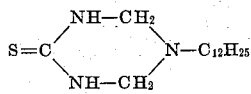

sulfur 11.22%: found, sulfur 10.82%.

EXAMPLE VII

*Tetrahydro-1,3-diphenyl-5-beta-hydroxyethyl-2-thio-2(1)-s-triazone*

Sixty-one parts of beta-hydroxyethylamine is added portion-wise with cooling to one hundred and sixty-two parts of a 37% aqueous solution of formaldehyde. To this solution two hundred and twenty-eight parts of thiocarbanilide (s-diphenylthiourea) and four hundred parts of dioxan are added. The resulting mixture is heated until all of the thiocarbanilide dissolves and then kept at room temperature for twenty hours. By concentrating and then cooling the solution, two hundred and twenty-five parts of tetrahydro-1,3-diphenyl-5-beta-hydroxyethyl-2-thio-2(1)-s-triazone is obtained. Yield: 72%. After recrystallization from hot ethanol the compound melts at 178° C. Analysis calculated for $$S=C \begin{array}{c} C_6H_5 \\ | \\ N-CH_2 \\ \diagup \quad \diagdown \\ \diagdown \quad \diagup NCH_2CH_2OH \\ N-CH_2 \\ | \\ C_6H_5 \end{array}$$

nitrogen 13.51%; found, nitrogen 13.33%.

EXAMPLE VIII

*Tetrahydro-4,6-dimethyl-5-beta-hydroxyethyl-2-thio-2(1)-s-triazone*

Forty-four parts of acetaldehyde is added portion-wise to a reactor containing an aqueous solution of seventy-six parts of thiourea and sixty-one parts of beta-hydroxyethylamine. The reaction mixture is cooled during the addition of the acetaldehyde so that the temperature does not exceed 25° C. After the resulting solution has remained at room temperature for twenty hours, it is cooled and the crystalline product is removed by filtration and recrystallized from ethanol. Twenty-five parts of tetrahydro-4,6-dimethyl-5-beta-hydroxyethyl-2-thio-2(1)-s-triazone melting at 168° C. is obtained. Yield: 16%.

| Analysis | Nitrogen | Sulfur |
|---|---|---|
| | Percent | Percent |
| Found | 22.58 | 16.83 |
| Calculated for 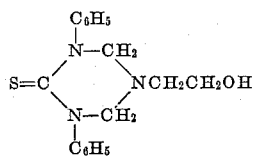 | 22.22 | 16.93 |

In the process of the present invention any acyclic urea having at least one hydrogen on each amido nitrogen and wherein all substituents on the urea nitrogen are hydrocarbon or hydrocarbon substituted with inert substituents may be employed including N mono and N,N'-disubstituted ureas and thioureas, for example, urea, nitroethylurea $H_2NCONHCH_2CH_2NO_2$, methoxyethylurea $H_2NCONHCH_2CH_2OCH_3$, thiourea, methylurea, N,N'-diethylurea, butylthiourea, N-methyl-N'-cyclohexylurea, β-dimethylaminoethylurea $(CH_3)_2NCH_2CH_2NHCONH_2$, chlorophenylurea $H_2NCONHC_6H_4Cl$, phenylurea, N-ethyl-N'-octylurea, N-methyl-N'-naphthylurea. Of the substituted ureas, those having hydrocarbon substituents are preferred.

Table I indicates tetrahydrotriazones which can be obtained from certain of the above ureas with methylamine and formaldehyde.

| | Urea | Triazone |
|---|---|---|
| (1) | $O=C\begin{array}{c}NH_2\\NH-CH_3\end{array}$ Methylurea | $O=C\begin{array}{c}NH-CH_2\\ \diagdown NCH_3 \\ N---CH_2\\|\\CH_3\end{array}$ Tetrahydro-1,5-dimethyl-2(1)-s-triazone |
| (2) | $S=C\begin{array}{c}NH_2\\NHC_4H_9\end{array}$ Butylthiourea | $S=C\begin{array}{c}NH-CH_2\\ \diagdown NCH_3 \\ N---CH_2\\|\\C_4H_9\end{array}$ Tetrahydro-1-butyl-5-methyl-2-thio-2(1)-3-triazone |
| (3) | $O=C\begin{array}{c}NHC_2H_5\\NHC_2H_5\end{array}$ Alpha, beta-diethylurea | $O=C\begin{array}{c}C_2H_5\\|\\N-CH_2\\ \diagdown NCH_3 \\ N-CH_2\\|\\C_2H_5\end{array}$ Tetrahydro-1,2-diethyl-5-methyl-2(1)-s-triazone |
| (4) | $S=C\begin{array}{c}NHC_6H_{11}\\NHCH_3\end{array}$ Alpha-methyl-beta-cyclohexylurea | $S=C\begin{array}{c}C_6H_{11}\\|\\N-CH_2\\ \diagdown NCH_3 \\ N-CH_2\\|\\CH_3\end{array}$ Tetrahydro-1,5-dimethyl-3-cyclohexyl-2-thio-2(1)-2-triazone |
| (5) | $O=C\begin{array}{c}NH_2\\NHC_6H_5\end{array}$ Phenylurea | $O=C\begin{array}{c}NH-CH_2\\ \diagdown NCH_3 \\ N---CH_2\\|\\C_6H_5\end{array}$ Tetrahydro-1-phenyl-5-methyl-2(1)-s-triazone |
| (6) | $O=C\begin{array}{c}NHC_2H_5\\NHC_8H_{17}\end{array}$ Alpha-ethyl-beta-octylurea | $O=C\begin{array}{c}C_2H_5\\|\\N-CH_2\\ \diagdown NCH_3 \\ N-CH_2\\|\\C_8H_{17}\end{array}$ Tetrahydro-1-ethyl-3-octyl-5-methyl-2(1)-s-triazone |
| (7) | $O=C\begin{array}{c}NHCH_3\\NHC_{10}H_7\end{array}$ Alpha-methyl-beta-naphthylurea | $O=C\begin{array}{c}CH_3\\|\\N-CH_2\\ \diagdown NCH_3 \\ N-CH_2\\|\\C_{10}H_7\end{array}$ Tetrahydro-1,5-dimethyl-3-naphthyl-2(1)-s-triazone |
| (8) | $O=C\begin{array}{c}NHC_6H_4Cl\\NHC_6H_4Cl\end{array}$ s-bis(p-Chlorophenyl) urea | $O=C\begin{array}{c}C_6H_4Cl\\|\\NH-CH_2\\ \diagdown NCH_3 \\ NH-CH_2\\|\\C_6H_4Cl\end{array}$ Tetrahydro-1,3-di(p-chlorophenyl)-5-methyl-2(1)-s-triazone |
| (9) | $O=C\begin{array}{c}NHCH_2CH_2NO_2\\NH_2\end{array}$ Beta-nitroethyl-urea | $O=C\begin{array}{c}CH_2CH_2NO_2\\|\\N---CH_2\\ \diagdown NCH_3 \\ NH-CH_2\end{array}$ Tetrahydro-1-beta-nitroethyl-5-methyl-2(1)-s-triazone |

In the process of the invention any primary aliphatic amine which is free from groups, other than the amino, which are as reactive as the amino group with dimethylolurea, may be used including, in addition to the methylamine disclosed in the above examples, tert-butylamine, octylamine, benzylamine, furfurylamine, dimethylaminoethylamine, ethylenediamine and hexamethylenediamine.

The primary aliphatic amine may be saturated, unsaturated, branched or straight chain, acyclic or alicyclic and substituted or not with inert groups, i. e., groups which do not interfere with the formation of tetrahydrotriazone as phenyl, chloro, hydroxyl, alkyloxy, and N-disubstituted amines or amides.

Table II below discloses certain triazones which can be prepared from the above amines and dimethylolurea.

| Amine | | Triazone |
|---|---|---|
| (1) | $(CH_3)_3CNH_2$ | $O=C\overset{NH-CH_2}{\underset{NH-CH_2}{\diagdown}}NC(CH_3)_3$ |
| | Tertiary butylamine | Tetrahydro-5-tert.-butyl-2(1)-s-triazone |
| (2) | $C_8H_{17}NH_2$ | $O=C\overset{NH-CH_2}{\underset{NH-CH_2}{\diagdown}}NC_8H_{17}$ |
| | Octylamine | Tetrahydro-5-octyl-2(1)-s-triazone |
| (3) | $C_6H_5CH_2NH_2$ | $O=C\overset{NH-CH_2}{\underset{NH-CH_2}{\diagdown}}NCH_2C_6H_5$ |
| | Benzylamine | Tetrahydro-5-benzyl-2(1)-s-triazone |
| (4) | $(C_4H_3O).CH_2NH_2$ | $O=C\overset{NH-CH_2}{\underset{NH-CH_2}{\diagdown}}NCH_2.(C_4H_3O)$ |
| | Furfurylamine | Tetrahydro-5-furfuryl-2(1)-s-triazone |
| (5) | $(CH_3)_2NCH_2CH_2NH_2$ | $O=C\overset{NH-CH_2}{\underset{NH-CH_2}{\diagdown}}NCH_2CH_2N(CH_3)_2$ |
| | Dimethylaminoethylamine | Tetrahydro-5-beta-dimethylaminoethyl-2(1)-s-triazone |
| (6) | $CH_2=CH-CH_2NH_2$ | $O=C\overset{NH-CH_2}{\underset{NH-CH_2}{\diagdown}}N-CH_2-CH=CH_2$ |
| | Allylamine | Tetrahydro-5-allyl-2(1)-s-triazone |
| (7) | $H_2NCH_2CH_2NH_2$ | $O=C\overset{NH-CH_2}{\underset{NH-CH_2}{\diagdown}}NCH_2CH_2N\overset{CH_2-NH}{\underset{CH_2-NH}{\diagdown}}C=O$ |
| | Ethylenediamine | 5,5'-Ethylene-bis(tetrahydro-2(1)-s-triazone) |
| (8) | $H_2N(CH_2)_6NH_2$ | $O=C\overset{NH-CH_2}{\underset{NH-CH_2}{\diagdown}}N(CH_2)_6N\overset{CH_2-NH}{\underset{CH_2-NH}{\diagdown}}C=O$ |
| | Hexamethylenediamine | 5,5'-Hexamethylene-bis(tetrahydro-2(1)-s-triazone) |

The aldehyde component may be any monoaldehyde including butyraldehyde, formaldehyde, acetaldehyde, furfuraldehyde, heptaldehyde, 5-hexenal-1, benzaldehyde, phenylacetaldehyde.

Certain aldehydes such as those having alpha, beta-unsaturation, e. g., acraldehyde and those having phenolic hydroxyl groups tend to form undesirable by-products and aldehydes free from these groupings are preferred. Aldehydes of the formula RCHO wherein R is saturated hydrocarbon are preferred.

Table III below tabulates compounds which can be prepared from certain of the above aldehydes, urea, and methylamine.

| Aldehyde | | Triazone |
|---|---|---|
| (1) | $C_6H_{13}CHO$ | $O=C\overset{NHCH(C_6H_{13})}{\underset{NHCH(C_6H_{13})}{\diagdown}}NCH_3$ |
| | Heptaldehyde | Tetrahydro-4,6-dihexyl-5-methyl-2(1)-s-triazone |
| (2) | $CH_2=CH-(CH_2)_3CHO$ | $O=C\overset{NH-CH(CH_2-CH_2-CH_2-CH=CH_2)}{\underset{NH-CH(CH_2-CH_2-CH_2-CH=CH_2)}{\diagdown}}NCH_3$ |
| | 5-Hexenal | Tetrahydro-4,6-di(4-pentenyl)-5-methyl-2(1)-s-triazone |
| (3) | $C_6H_5CHO$ | $O=C\overset{NH-CH(C_6H_5)}{\underset{NH-CH(C_6H_5)}{\diagdown}}NCH_3$ |
| | Benzaldehyde | Tetrahydro-4,6-diphenyl-5-methyl-2(1)-s-triazone |
| (4) | $C_6H_5CH_2CHO$ | $O=C\overset{NH-CH(CH_2C_6H_5)}{\underset{NH-CH(CH_2C_6H_5)}{\diagdown}}NCH_3$ |
| | Phenylacetaldehyde | Tetrahydro-4,6-dibenzyl-5-methyl-2(1)-s-triazone |
| (5) | $NO_2.C_6H_4CH_2CHO$ | $O=C\overset{NH-CH(CH_2C_6H_4NO_2)}{\underset{NH-CH(CH_2C_6H_4NO_2)}{\diagdown}}NCH_3$ |
| | p-Nitrophenylacetaldehyde | Tetrahydro-4,6-di(p-nitrophenylmethyl)-5-methyl-2(1)-s-triazone) |

The urea and aldehyde may be introduced into the reaction as such or in the form of the urea aldehyde primary condensation product, i. e., as a dimethylolurea. The product from urea and formaldehyde is dimethylolurea itself. The product from higher aldehydes is a dimethylolurea wherein one hydrogen of each of the methylene ($CH_2$) groups is replaced by the radical R of the original aldehyde RCHO.

The dimethylolurea may have neither, one, or both of the amido hydrogens substituted by an aliphatic or an aromatic hydrocarbon radical. Dimethylolureas formed by the addition of aldehydes containing one or more carbon atoms to a urea which has at least one amido hydrogen attached to each of the two amido nitrogen atoms may be used in this invention. An aldehyde and an unsubstituted or a N-mono- or an N,N'-disubstituted urea may be used instead of a preformed dimethylolurea.

The invention is likewise generic to, as new products, symmetrical tetrahydrotriazones, including tetrahydrothiotriazones having the valences of the nitrogen in the 5-position satisfied by aliphatic carbon and preferably by an aliphatic hydrocarbon radical.

The hydrogen atoms on annular atoms 1, 3, 4 and 6 may or may not be replaced by substituents. Thus the preferred compounds from dimethylolurea and dimethylolthiourea have only hydrogen on annular atoms 1, 3, 4, and 6. Those from aldehydes other than formaldehyde have substituents in the 4 and 6 position. Those from monosubstituted ureas have substituents in the 1 or 3 position. Those from symmetrically disubstituted ureas have substituents in the 1 and 3 positions. Those from aldehydes other than formaldehyde and disubstituted ureas have substituents in all four positions in addition to the substituent on the 5-nitrogen.

The general formula for the tetrahydrotriazones of this invention is

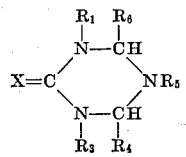

wherein X is O or S, $R^1$ is a substituent in position 1, $R^3$ in position 3, etc. $R^1$, $R^3$, $R^4$ and $R^6$ are monovalent substituents either hydrogen or monovalent organic radicals whose free valences stem from carbon including aliphatic, aromatic, heterocyclic and alicyclic monovalent hydrocarbon radicals. $R^1$, $R^3$, $R^4$, and $R^6$ are preferably hydrogen or hydrocarbon, preferably aliphatic radicals. One preferred subgenera is that in which $R^5$ is alkyl. Another is that wherein $R^5$ is hydroxyalkyl. $R^5$ is a monovalent organic radical attached to the 5 nitrogen through singly bonded aliphatic carbon. It may be saturated or unsaturated, acyclic or alicyclic, branched or straight chain and may or may not contain as substituents such essentially inert groups as phenyl, hydroxy, dialkylamino and alkoxy. $R^5$ is preferably hydrocarbon or hydrocarbon bearing an alcoholic hydroxyl, at least two carbons removed from the nitrogen.

The tetrahydrotriazones herein described may be used for many purposes such as pesticides, lubricant addition agents, textile modifying agents and rubber accelerators.

The process in which aliphatic aldehydes are used and the products obtained thereby represent a preferred embodiment of the invention, since aliphatic aldehydes undergo the condensation more readily than aromatic aldehydes. The process in which saturated aliphatic aldehydes are used and the products obtained thereby represent more preferred embodiments of the invention, since the use of certain unsaturated aldehydes (such as alpha, beta-unsaturated aldehydes) may lead to undesirable side reactions.

The 5-substituted tetrahydrotriazones which are derivatives of formaldehyde and the process of preparing them represent the still more preferred embodiments of the invention. The tetrahydrotriazones which are derivatives of formaldehyde act differently in many applications from the 4,6-substituted tetrahydrotriazones.

The process in which aliphatic primary monoamines are used and the products obtained thereby represent preferred embodiments of the invention, since there is a greater possibility for undesirable side reactions when diprimary amines are employed. For the same reason the use of saturated aliphatic primary amines is preferred over the use of unsaturated aliphatic primary amines.

Because of the availability and cheapness of urea and formaldehyde and also dimethylolurea and the ready reaction thereof with primary amines, the tetrahydrotriazones derived from these reagents and the process of preparing them represent preferred embodiments of the invention.

The above description and examples are intended to be illustrative only. Any modification of or variation therefrom which conforms to the spirit of the invention is intended to be included within the scope of the claim.

What is claimed is:

Tetrahydro-5-(beta-hydroxyethyl)-s-triazone of the formula

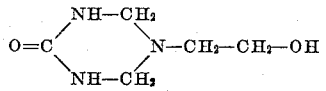

WILLIAM JAMES BURKE.

CERTIFICATE OF CORRECTION.

Patent 2,304,624.

December 8, 1942.

WILLIAM JAMES BURKE.

It is hereby certified that error appears in the printed specification of the above numbered patent requiring correction as follows: Page 2, second column, in the table, second column thereof, for "41.48" read --41.38--; line 30, for "ehanol" read --ethanol--; and that the said Letters Patent should be read with this correction therein that the same may conform to the record of the case in the Patent Office.

Signed and sealed this 2nd day of February, A. D. 1943.

Henry Van Arsdale,
Acting Commissioner of Patents.

(Seal)